United States Patent [19]

Kuwabara et al.

[11] Patent Number: 4,521,113

[45] Date of Patent: Jun. 4, 1985

[54] OPTICAL MEASURING DEVICE

[75] Inventors: Yoshiharu Kuwabara; Yasuharu Takayama; Hiroyoshi Hamada, all of Kanagawa, Japan

[73] Assignee: Mitutoyo Mfg. Co., Ltd., Tokyo, Japan

[21] Appl. No.: 382,303

[22] Filed: May 26, 1982

[30] Foreign Application Priority Data

Jun. 17, 1981 [JP] Japan ................................. 56-93543

[51] Int. Cl.³ .............................................. G01B 11/02
[52] U.S. Cl. .................................... 356/387; 350/6.91
[58] Field of Search ............... 356/386, 387, 431, 448; 250/563, 571, 572; 350/6.5, 6.7, 6.8, 6.91, 300

[56] References Cited

U.S. PATENT DOCUMENTS

| | | | |
|---|---|---|---|
| 1,999,023 | 4/1935 | Sharp et al. | 356/448 |
| 2,515,762 | 7/1950 | Dimmick | 356/448 |
| 3,394,628 | 7/1968 | Mori et al. | 356/448 |
| 3,765,774 | 10/1973 | Petrohilos | 356/387 |
| 4,040,750 | 8/1977 | Zwiener | 356/448 |
| 4,277,178 | 7/1981 | Cushing et al. | 356/431 |

*Primary Examiner*—R. A. Rosenberger
*Attorney, Agent, or Firm*—Koda and Androlia

[57] ABSTRACT

An optical measuring device wherein a workpiece being measured is interposed between a parallel scanning ray beam generating source and a light receiving element, and dimensions of the workpiece being measured is measured from the time length of a dark portion or a bright portion generated due to the obstruction of the parallel scanning ray beams by the workpiece being measured. The aforesaid parallel scanning ray beam generating source comprises: a beam generator; a rotary mirror for reflecting and converting the incident ray beams into rotary scanning ray beams; a ray beam transmitting mechanism for dividing the ray beams from the beam generator in terms of time or quantity and causing the ray beams thus divided to incide into the rotary mirror at a predetermined incident angles; and a collimator lens for converting the rotary scanning ray beams from the rotary mirror into parallel scanning ray beams.

7 Claims, 6 Drawing Figures

OPTICAL MEASURING DEVICE

BACKGROUND OF THE INVENTION

1. Field of the Invention

This invention relates to an optical measuring device, and more particularly to improvements in an optical measuring device, wherein parallel scanning ray beams are utilized to measure dimensions of a workpiece being measured.

2. Description of the Prior Art

Heretofore, there has been adopted an optical measuring device wherein rotary scanning ray beams are converted by a collimator lens into parallel scanning ray beams being passed through this collimator lens and a condensing lens, a workpiece being measured is interposed between the collimator lens and the condensing lens, and dimensions of the workpiece being measured are measured from the time length of a dark portion or a bright portion generated due to the obstruction of the parallel scanning ray beams by the workpiece being measured.

More specifically, as shown in FIG. 1, laser beams are oscillated from a laser tube 1 toward a stationary mirror 2, the laser beams thus reflected are converted into scanning beams by a rotary mirror 3, the scanning beams are converted beams by a rotary mirror 3 having two surfaces, the scanning beams are converted into parallel scanning ray beams by a collimator lens 4, an article 6 being measured interposed between the collimator lens 4 and a condensing lens 5 is scanned at high speed by the parallel scanning ray beams, and dimensions of the workpiece 6 being measured are measured from the time length of a dark portion or a bright portion generated due to the obstruction of the parallel scanning ray beams by the workpiece 6 being measured.

The bright and dark portions of the parallel scanning ray beams are detected as variations in output voltage of a light receiving element 7 disposed at the focal point of the condensing lens 5. Signals from the light receiving element 7 is fed to a pre-amplifier 8, where they are amplicied (Refer to v), and then, fed to a segment selector circuit 9. This segment selector circuit 9 is adapted to generate a voltage V to open a gate circuit 10 only for a time t, during which the article 6 being measured is scanned, from the time of the voltage output of the light receiving element 7 and feeds the same to the gate circuit 10. A continuous clock pulse CP is fed to this gate circuit 10 from a clock pulse oscillator circuit 11, whereby the gate circuit 10 generates a clock pulses P for counting the time t corresponding to the outer diameter of the workpiece 6 being measured and feeds the same to a counter circuit 12. Upon counting the clock pulses P, the counter circuit 12 feeds a count signal to a digital indicator 13, where the outer diameter of the workpiece 6 being measured is digitally indicated.

In FIG. 1, designated at reference numeral 14 is a synchronous sine wave oscillator circuit, 15 a power amplifier and 16 a synchronous motor. The synchronous motor 16 rotates the rotary mirror 3 in synchronism with the clock pulses in response to synchronous signals fed from the synchronous sine wave oscillator circuit 14 in response to the continuous clock pulses CP fed from the clock pulse oscillator circuit 11, whereby the measuring accuracy is maintained.

The above-described measuring method has been widely utilized because the lengths, thickness and the like of moving workpieces and workpieces heated to a high temperature can be measured at high accuracies in non-contact relationship therewith.

However, in the case of the above-described device, since the rotary mirror 3 has two surfaces only, the angle of use $\theta$ for generating the scanning beams is small as shown in FIG. 1, thus presenting the disadvantage that the measuring speed is low. More specifically, if the rotary mirror rotates at a constant speed, then the number of measurements in a predetermined time period is small, and consequently, it takes a long time to conduct a predetermined number of measurements.

In contrast thereto, it might be thought of to try to use a rotary mirror having three or more surfaces, however, in that case, the prodiction thereof results in increased cost.

It might be thought of to try to increase the rotational speed of the rotary mirror, however, in this case, the resolving power, i.e., mm/pulse is determined by a scanning speed per unit length (specific scanning speed) of the workpiece being measured, the resolving power is in inversely proportional to this specific scanning speed, and hence, the increase in rotational speed results in decreased resolving power. On the other hand, it might be thought of to try to improve the averaged accuracy by the increase in the number of scannings, with the specific scanning speed being kept constant. In this case, however, turning with electric circuit including the oscillator becomes complicated and it is not preferable from the viewpoint of increasing the response speed to a high speed.

SUMMARY OF THE INVENTION

It is therefore the primary object of the present invention to provide an optical measuring device, wherein the number of scannings is increased without changing the specific scanning speed, thus resulting in improved accuracy and reliability.

An object of the present invention is to provide an optical measuring device, wherein ray beams from a ray beam generating source are divided without being attenuated and the number of scannings is increased.

Another object of the present invention is to provide an optical measuring device having an easy arrangement and capable of increasing the number of scannings without changing the specific scanning speed.

To achive the above-described objects, according to the present invention, in an optical measuring device wherein a workpiece being measured is interposed between a parallel scanning ray beam generating source and a light receiving element, and dimensions of the workpiece being measured are measured from the time length of a dark portion or a bright portion generated due to the obstruction of the parallel scanning ray beams by the workpiece being measured, the aforesaid parallel ray beam generating source comprises: a beam generator; a rotary mirror for reflecting and converting the incident ray beams into rotary scanning ray beams; a ray beam transmitting mechanism for dividing the ray beams from the aforesaid beam generator in terms of time or quantity and causing the ray beams thus divided to incide into the aforesaid rotary mirror at a predetermined incident angle; and a collimator lens for converting the rotary scanning ray beams into parallel scanning ray beams.

To achieve the above-described objects, according to the present invention, in the above-described optical measuring device, the aforesaid ray beam transmitting mechanism comprises: half-transmitting/reflecting means for reflecting part of the ray beams from the beam generator toward the rotary mirror and transmitting the remaining part therethrough; and reflecting means for reflecting and causing the ray beams which have been transmitted through the half-transmitting/reflecting means to incide into the rotary mirror in a direction different from the reflected ray beams reflected by the aforesaid half-transmitting/reflecting means.

To achieve the above-described objects, according to the present invention, in the above-described optical measuring device, the aforesaid ray beam transmitting mechanism comprises: movable reflecting means for selectively taking in synchronism with the rotary mirror a position for reflecting the ray beams from the beam generator toward the rotary mirror and another position for allowing the aforesaid ray beams to be passed therethrough rectilinearly; and reflecting means for reflecting and causing the aforesaid ray beams which have been passed through rectilinearly to incide into the rotary mirror in a direction different from the aforesaid ray beams reflected by the reflecting means.

To achieve the above-described objects, according to the present invention, in the above-described optical measuring device, the aforesaid movable reflecting means is formed of a mirror rectilinearly movable sideways into and out of a light path of the ray beams between the beam generator and the reflecting means.

To achieve the above-described objects, according to the present invention, in the above-described optical measuring device, the aforesaid movable reflecting means is formed of a rotary reflecting mirror having a rotary shaft thereof incorporated in a plane perpendicularly intersecting a rotary shaft of the aforesaid rotary mirror.

To achieve the above-described objects, according to the present invention, in the above-described optical measuring device, the aforesaid ray beam transmitting mechanism comprises: an intermittent rotary mirror capable of intermittently taking in synchronism with the rotary mirror a plurality of positions for reflecting the ray beams from the beam generator in different directions; and reflecting means disposed in opposed relations to the ray beams different in direction from said intermittent rotary mirror for reflecting and causing the aforesaid ray beams to incide into the rotary mirror in a different direction or directions.

BRIEF DESCRIPTION OF THE INVENTION

The exact nature of this invention, as well as other objects and advantages thereof, will be readily apparent from consideration of the following specification relating to the accompanying drawings, in which like reference characters designate the same or similar parts throughout the figures thereof and wherein.

DETAILED DESCRIPTION OF THE INVENTION

Detailed description will hereunder be given of the embodiments of the present invention with reference to the drawings.

Figure 1:
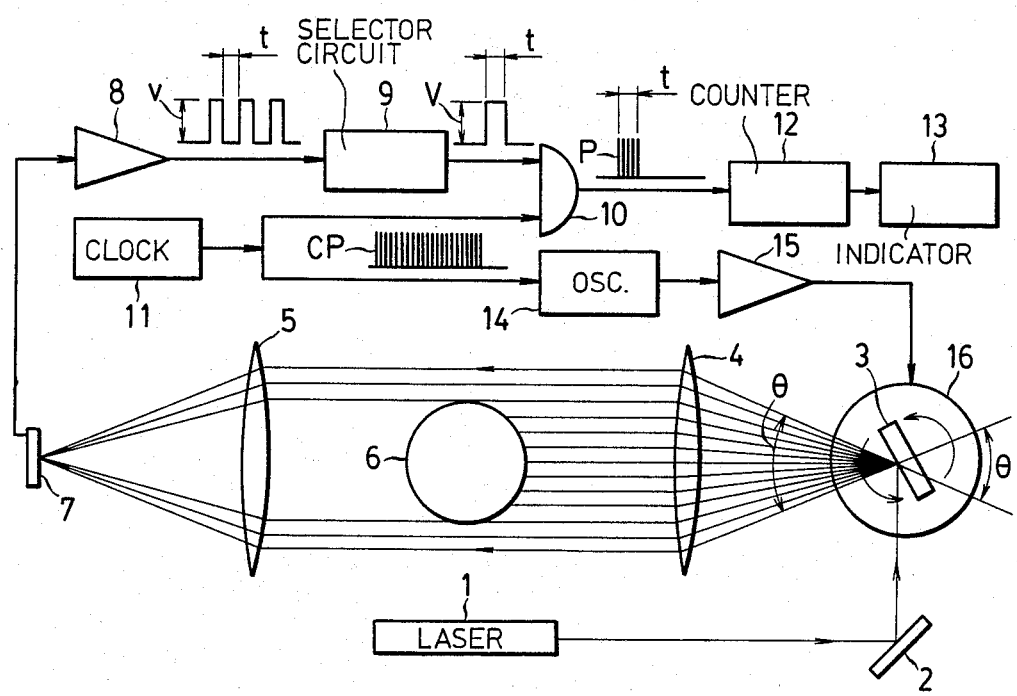
FIG. 1 is a plan view partially including a block diagram, showing the measuring device therefor using the parallel scanning ray beams in the prior art.
Figure 2:
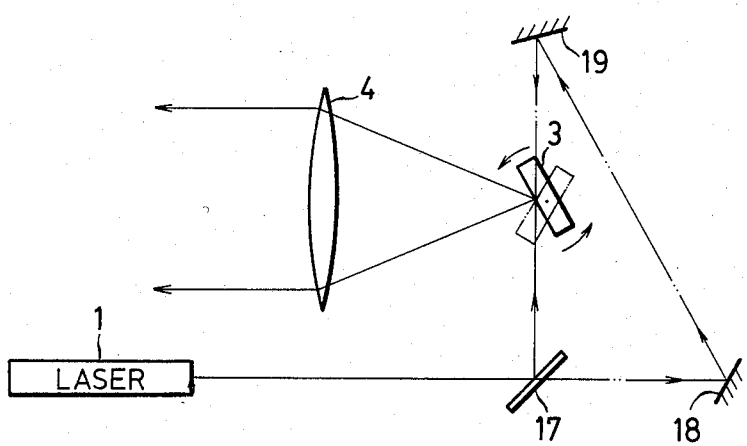
FIG. 2 is a schematic plan view showing the essential portions of a first embodiment of the optical measuring device according to the present invention.

FIG. 2 is a schematic plan view showing an embodiment of the optical measuring device according to the present invention. In the drawing, same reference numerals as shown in FIG. 1 are used to designate same or similar parts, so that description thereof will be omitted.

As shown in FIG. 2, in this embodiment, a ray beam transmitting mechanism for dividing the ray beams from a laser tube 1 as being a beam generator and causing the ray beams thus divided to incide into a rotary mirror 3 at predetermined incident angles comprises: a half mirror 17 as being half-transmitting/reflecting means for reflecting part of the ray beams from the laser tube 1 toward the rotary mirror and causing the remaining part of the ray beams to be passed therethrough rectilinearly; and two mirrors 18 and 19 for reflecting and causing the ray beams which have transmitted the half mirror 17 (as indicated by two-dot chain lines) to incide into the aforesaid rotary mirror in a direction different through 180° to the ray beams reflected by the aforesaid half mirror 17 (as indicated by solid lines).

Figure 3:
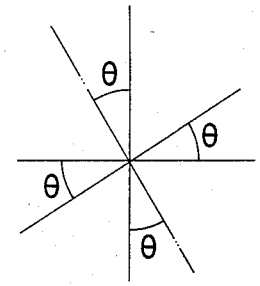
FIG. 3 is a chart showing the scope of scanning angles in the above-mentioned embodiment.

More specifically, in this embodiment, the ray beams from the laser tube 1 are quantitatively divided by the half mirror 17 and radiated onto the rotary mirror 3 in different directions, whereby four rotary scanning ray beams per rotation of the rotary mirror 3 are formed as shown in FIG. 3.

Figure 4:
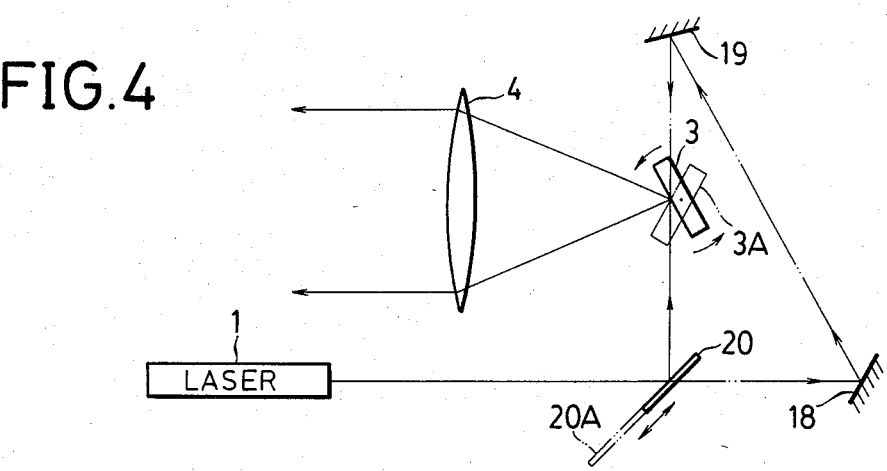
FIG. 4 is a plan view similar to FIG. 2, showing a second embodiment of the present invention.

Description will now be given of a second embodiment of the present invention as shown in FIG. 4.

In this embodiment, the half mirror 17 in the embodiment shown in FIG. 2 is replaced by a mirror 20 rectilinearly movable into and out of a light path of the ray beams from the laser tube 1 in one and the same plane as the reflecting surface of the aforesaid half mirror 17. This mirror 20 is adapted to rectilinearly move in synchronism with the rotation of the rotary mirror 3. More specifically, when the rotary mirror 3 is positioned in the vicinity of solid lines in FIG. 4, the mirror 20 is also disposed at a position indicated by solid lines in FIG. 4, i.e., a position for reflecting the ray beams from the laser tube 1, and when the rotary mirror 3 is positioned in the vicinity of two-dot chain lines 3A in FIG. 4, the mirror 20 is disposed at a position indicated by two-dot chain lines 20A, i.e., a retracted position for allowing the ray beams from the laser tube 1 to go forward rectilinearly toward the mirror 18, whereby the mirror 20 is reciprocated two times per rotation of the rotary mirror 3.

This embodiment is advantageous in that the ray beams are not attenuted as compared with the embodiment shown in FIG. 2 because the ray beams from the laser tube 1 is divided in terms of time, but not quantitatively.

Figure 5:
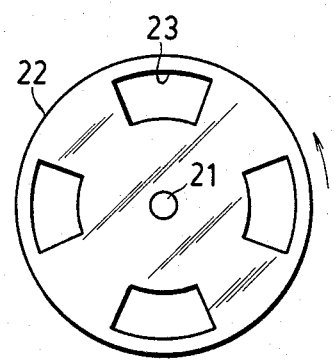
FIG. 5 is a plan view showing the rotary reflecting mirror in a third embodiment of the present invention.

The mirror 20 used as the means for dividing the ray beams from the laser tube 1 in terms of time as shown in the above-described embodiment shown in FIG. 4 may be replaced by a rotary reflecting mirror 22 having a rotary shaft 21 thereof incorporated in a plane perpendicularly intersecting a rotary shaft of the aforesaid rotary mirror 3 as shown in FIG. 5. More specifically, this rotary reflecting mirror 22 is a disk-shaped mirror formed therein with four windows 23 disposed at regular angular intervals. When the rotary mirror 3 is positioned in the vicinity of the two-dot chain lines 3A in FIG. 4, one of the windows 23 allows the ray beams from the laser tube 1 to be passed therethrough toward the mirror 18, and, when the rotary mirror 3 is positioned in the vicinity of solid lines in FIG. 4, the portion other than windows 23 reflects the ray beams from the laser tube 1 toward the rotary mirror 3, whereby the rotary reflecting mirror 22 is rotated in synchronism with the rotary mirror 3 so as to rotate once per rotation of the rotary mirror 3.

This embodiment shown in FIG. 5 is advantageous in that the optical measuring device is easily arranged as compared with the arrangement shown in FIG. 4 because the mirror 22 is rotary.

Figure 6:
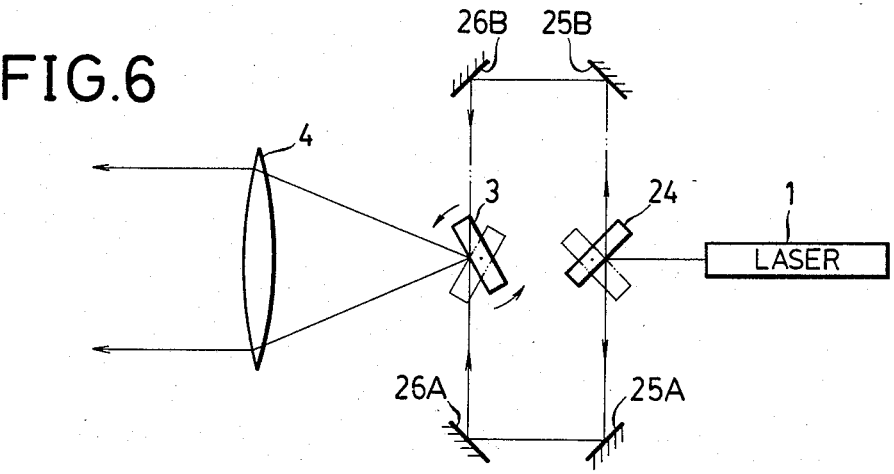
FIG. 6 is a plan view similar to FIG. 2, showing a fourth embodiment of the present invention.

Description will hereunder be given of a fourth embodiment of the present invention as shown in FIG. 6.

In this embodiment, the laser tube 1 is disposed on an extension of the center axes of the collimator lens 4 and the rotary mirror 3, an intermittent rotary mirror 24 is provided which can take two reflecting positions for reflecting the ray beams from the laser tube 1 in directions different through 180° from each other and can intermittently take these reflecting positions in synchronism with the aforesaid rotary mirror 3, and two pairs of mirrors 25A, 26A and 25B, 26B are provided which are adapted to reflect the ray beams to incide into the aforesaid rotary mirror 3 in two directions different through 180° from each other.

More specifically, when the rotary mirror 3 is positioned in the vicinity of solid lines in FIG. 6, the aforesaid intermittent rotary mirror 24 takes a position where the ray beams from the laser tube 1 is reflected through 90° downwardly (as indicated by a solid line), and, when the rotary mirror 3 is positioned in the vicinity of two-dot chain lines in FIG. 6, the intermittent rotary mirror 24 also takes a position indicated by two-dot chain lines in FIG. 6, where the ray beams are reflected upwardly (as indicated by two-dot chain lenes).

Additionally, in the above-described embodiments, the rotary mirror 3 having two surfaces may be replaced by one having three or more surfaces. Furthermore, the mirrors including the half-transmitting means should not necessarily be reflectors, but may be replaced by prisms.

It should be apparent to those skilled in the art that the abovedescribed embodiments are merely representative, which represent the appilications of the principles of the present invention. Numerous and varied other arrangements can be readily devised by those skilled in the art without departing from the spirit and the scope of the invention.

What is claimed is:

1. An optical measuring device wherein said device having a parallel scanning beam generator comprising a beam generator, a rotary mirror for reflecting incident beams into said scanning beams and a collimator lens for converting said rotary scanning beams from said rotary mirror into parallel scanning beams, wherein a workpiece to be measured is interposed between said parallel scanning beam generator and a light receiving element, and dimensions of the workpiece are measured from the time length of a dark portion or a bright portion generated due to the obstruction of the parallel scanning beams by the workpiece, characterized in that said rotary mirror is formed into as a plate-shaped one, opposite surfaces of which are reflectory surfaces, and said parallel scanning beam generator has a beam transmitting mechanism, in which the beams from said beam generator are split into two and the split beams are caused to be incident upon said rotary mirror from two directions opposite to each other, whereby the two reflectory surfaces of said rotary mirror alternately reflect the split beams from the two directions.

2. An optical measuring device as set forth in claim 1, wherein said ray beam transmitting mechanism comprises: semireflecting means for reflecting part of the beams from the beam generator toward the rotary mirror and transmitting the remaining part therethrough; and reflecting means for reflecting and causing the ray beams, which have been transmitted through the half-transmitting/reflecting means, to be incident into the rotary mirror in a direction different from the reflected ray beams reflected by said half-transmitting/reflecting means.

3. An optical measuring device as set forth in claim 1, wherein said beam transmitting mechanism comprises: movable reflecting means for selectively taking in synchronism with said rotary mirror a position for reflecting the beams from said beam generator toward the rotary mirror and another position for allowing the beams to be passed therethrough rectilinearly; and reflecting means for reflecting and causing the beams, which have been passed through rectilinearly, to be incident into said rotary mirror in a direction different from the beams reflected by said reflecting means.

4. An optical measuring device as set forth in claim 3, wherein said movable reflecting means is formed of a mirror rectilinearly movable sideways into and out of a light path of the beams between said beam generator and the reflecting means.

5. An optical measuring device as set forth in claim 3, wherein said movable reflecting means is formed of a rotary reflecting mirror having a rotary shaft thereof incorporated in a plane perpendicularly intersecting a rotary shaft of the said rotary mirror.

6. An optical measuring device as set forth in claim 5, wherein said rotary reflecting mirror is formed wherein with windows disposed at regular intervals in a circumferential direction centered about a rotary shaft of said mirror, and the portion other than said windows forms a reflecting mirror.

7. An optical measuring device as set forth in claim 1, wherein said beam transmitting mechanism comprises: an intermittent rotary mirror capable of intermittently taking in synchronism with said rotary mirror a plurality of positions for reflecting the beams from said beam generator in different directions; and reflecting means disposed in opposed relations to the beams different in direction from said intermittent rotary mirror for reflecting and causing the beams to be incident into said rotary mirror in a different direction or directions.

* * * * *